United States Patent
Pering et al.

(10) Patent No.: US 6,687,006 B2
(45) Date of Patent: Feb. 3, 2004

(54) HETERODYNE BASED OPTICAL SPECTRUM ANALYSIS WITH REDUCED DATA ACQUISITION REQUIREMENT

(75) Inventors: Richard D. Pering, Mountain View, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 71 days.

(21) Appl. No.: 09/967,832

(22) Filed: Sep. 28, 2001

(65) Prior Publication Data

US 2003/0063285 A1 Apr. 3, 2003

(51) Int. Cl.[7] .................................................. G01B 9/02

(52) U.S. Cl. ........................................ 356/451; 356/484

(58) Field of Search ................................ 356/451, 477, 356/484; 359/191, 192, 193, 194, 195; 398/204, 205, 206, 207, 208, 209, 210, 211, 212, 213, 214

(56) References Cited

U.S. PATENT DOCUMENTS

| 3,714,464 | A | * | 1/1973 | Nutt | ............................ | 327/61 |
| 3,776,381 | A | * | 12/1973 | Wood | .......................... | 209/549 |
| 4,856,899 | A |  | 8/1989 | Iwaoka et al. | ............... | 356/346 |
| 6,486,958 | B1 | * | 11/2002 | Szafraniec et al. | ......... | 356/451 |

* cited by examiner

Primary Examiner—Samuel A. Turner
Assistant Examiner—Michael A. Lyons

(57) ABSTRACT

Heterodyne based optical spectrum analysis (OSA) involves mixing an input signal with a swept local oscillator signal to generate a heterodyne beat signal and then stretching the heterodyne beat signal before the signal is sampled. A system for optical spectrum analysis includes a local oscillator source, an optical coupler, a heterodyne receiver, and a processor. A circuit for stretching the heterodyne beat signal is included in the heterodyne receiver and may include a diode in series with a capacitor and a resistor or a diode in series with a capacitor and a switch. Stretching the heterodyne beat signal involves extending the duration of the signal so that the signal can be detected with fewer samples per unit of time than an unstretched signal. Another embodiment of an OSA includes a first data acquisition unit for obtaining low resolution data and a second data acquisition unit for obtaining high resolution data.

37 Claims, 7 Drawing Sheets

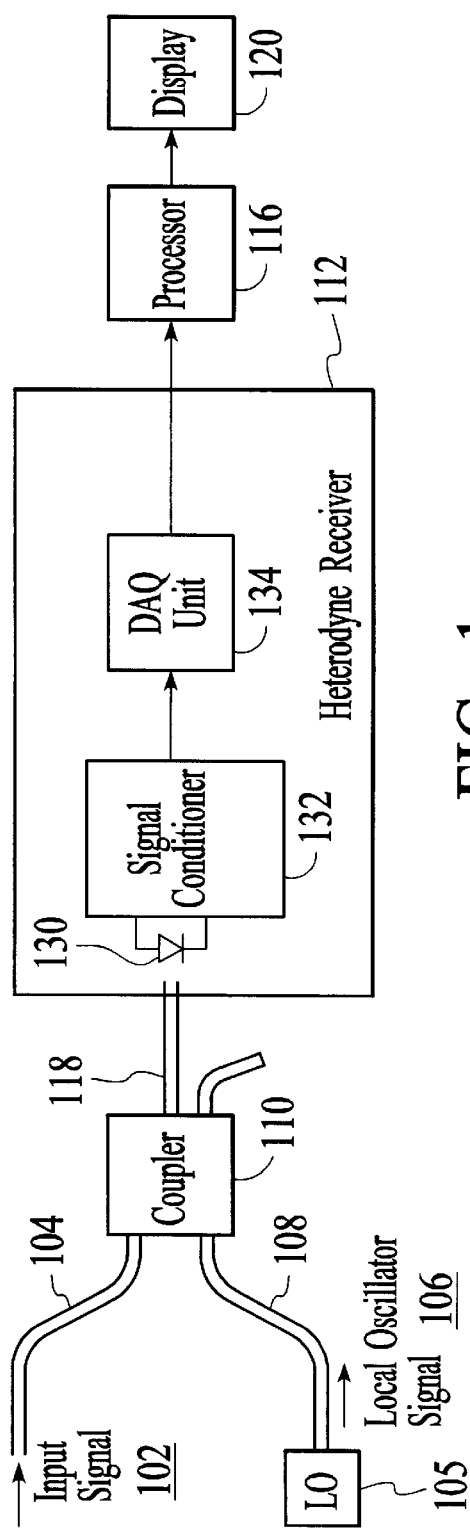
FIG. 1 (PRIOR ART)
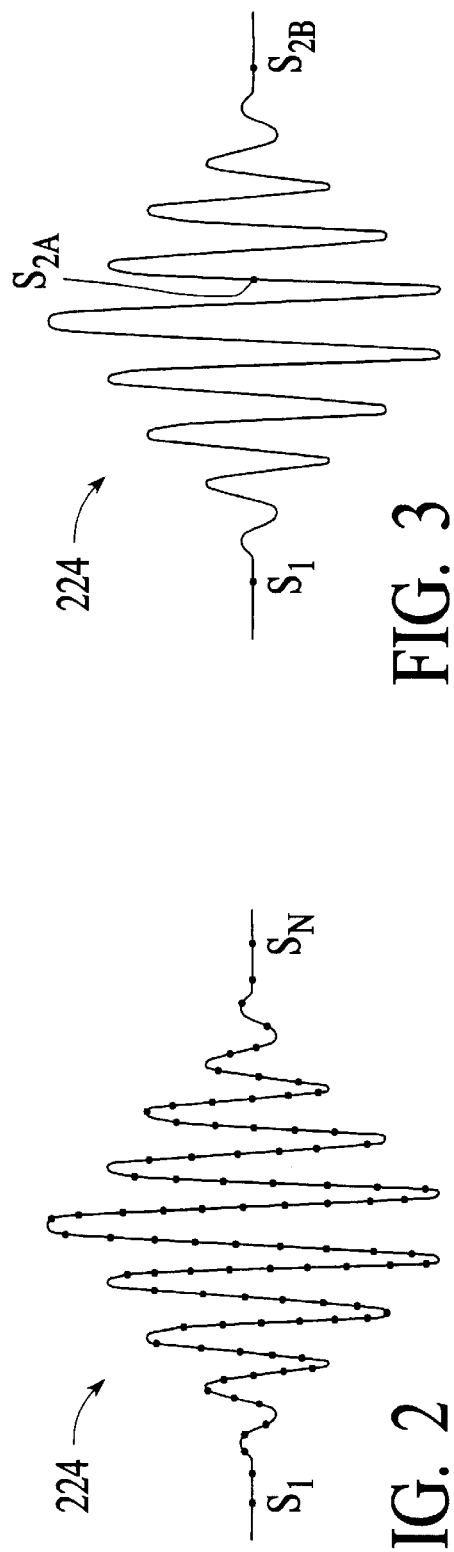
FIG. 2 (PRIOR ART)
FIG. 3 (PRIOR ART)

HETERODYNE BASED OPTICAL SPECTRUM ANALYSIS WITH REDUCED DATA ACQUISITION REQUIREMENT

FIELD OF THE INVENTION

The invention relates generally to the field of optical measurements and measuring systems, and more particularly to a method and system for optical spectrum analysis that utilizes optical heterodyne detection.

BACKGROUND OF THE INVENTION

Dense wavelength division multiplexing (DWDM) requires optical spectrum analyzers (OSAs) that have higher spectral resolution than is typically available with current OSAs. For example, grating based OSAs and autocorrelation based OSAs encounter mechanical constraints, such as constraints on beam size and the scanning of optical path lengths, which limit the degree of resolution that can be obtained. For example, grating based OSAs can achieve a spectral resolution on the order of 100 picometers (pm). As an alternative to grating based and autocorrelation based OSAs, optical heterodyne detection systems can be utilized to monitor DWDM systems.

Optical heterodyne detection systems involve mixing an input signal with a local oscillator signal. Optical heterodyne detection systems can be utilized for optical spectrum analysis of an input optical signal by mixing the input signal with a local oscillator signal that is swept across a range of wavelengths or frequencies. Heterodyne based OSAs can achieve a spectral resolution on the order of 0.001 pm.

FIG. 1 depicts an example of a heterodyne based OSA that includes an optical coupler 110 that combines an input signal 102 from an input fiber 104 with a swept local oscillator signal 106 from a local oscillator source 105 via local oscillator fiber 108. The combined input and local oscillator signals travel on an output fiber 118 and are detected by a heterodyne receiver 112. A detector 130 within the heterodyne receiver converts optical radiation from the combined input and local oscillator signals into an electrical signal. Square law detection results in mixing of the combined input and local oscillator signals and produces a heterodyne beat signal at a frequency that is equal to the frequency difference between the input and local oscillator signals. The heterodyne beat signal is conditioned by a signal conditioner 132 and a data acquisition (DAQ) unit 134 generates digital heterodyne beat signal data from the conditioned heterodyne beat signal. The digital heterodyne beat signal data generated by the data acquisition unit is processed by a processor 116 to determine a characteristic of the input signal, such as frequency, wavelength, or amplitude. A characteristic of the input signal, such as a waveform or fringe pattern, can then be output to a display 120.

FIG. 2 depicts an example heterodyne beat signal 224 that is generated in response to mixing of an input signal and a swept local oscillator signal using the heterodyne based OSA of FIG. 1. The heterodyne beat signal is graphed with intensity on the vertical scale and time on the horizontal scale and the pattern formed by the heterodyne beat signal is referred to as a fringe pattern.

To provide enough data points so that the processor 116 can adequately resolve the fringe pattern, the data acquisition unit 134 must sample the fringe pattern at a rate that produces multiple samples of each fringe. FIG. 2 depicts samples $S_1$ through $S_N$ that are obtained at a high enough sampling rate to adequately resolve the fringe pattern. One tradeoff to obtaining enough samples to adequately resolve a fringe pattern is that a large number of data points are generated and must be processed. For example, a 100 nm scan at a sweep rate of 40 nm/s and a sampling rate of 10 MHz will produce 25 million data points. Generating and processing large numbers of data points can add unwanted delay to the production of scan results.

One way to reduce the number of data points generated by a heterodyne based OSA is to reduce the scan width of the local oscillator signal. However, reducing the scan width of the local oscillator signal is not desirable because it limits the range of optical signals that can be detected by the OSA.

Alternatively, the number of data points generated during a scan can be reduced by reducing the sampling rate of the data acquisition unit. That is, a fewer number of samples of the fringe pattern are taken per unit of time. The sampling rate of the data acquisition unit can be reduced without reducing the scan width or the sweep rate of the local oscillator signal. Although reducing the sampling rate of the data acquisition unit without reducing the scan width or the local oscillator sweep rate reduces the number of data points generated per scan, reducing the sample rate also increases the possibility of not detecting the input signal during a given scan. For example, the input signal may not be detected if a sample is taken at or near a zero crossing or if the input signal passes between sampling events. FIG. 3 depicts the example heterodyne beat signal 224 of FIG. 2, where the fringe pattern is sampled at a greatly reduced rate. In the example of FIG. 3, a first sample, $S_1$, is taken before the appearance of the fringe pattern. With a reduced sampling rate, the next sample could be taken at or near any of the many zero crossings. For example, sample $S_{2A}$ is taken at a zero crossing and therefore no signal is detected during the sampling event. If a sample is taken at or near a zero crossing and no other samples of the fringe pattern are obtained because of the reduced sampling rate, the input signal will not be detected. In another scenario, if the sampling period is too long, or the fringe pattern is too short, the next sample could be taken after the appearance of the fringe pattern, such that the input signal is not detected. For example, sample $S_{2B}$ is taken after the appearance of the fringe pattern and therefore no signal is detected. Either way, a sampling rate that may allow the fringe pattern to go undetected in not desirable. While in some situations, it may be sufficient to simply detect the presence of an input signal without being able to fully resolve the fringe pattern of the signal, it is not desirable to allow the fringe pattern to go undetected.

In view of the limitations of prior art heterodyne based OSAs, what is needed is a heterodyne based optical spectrum analysis technique that reduces the volume of data generated per scan while maintaining a broad scan width and fast local oscillator sweep rate that does not jeopardize the resolution achievable through heterodyne based optical spectrum analysis.

SUMMARY OF THE INVENTION

A method and system for heterodyne based optical spectrum analysis involves mixing an input signal with a swept local oscillator signal to generate a heterodyne beat signal and then stretching the heterodyne beat signal before the signal is sampled. The heterodyne beat signal is stretched before it is sampled so that the signal can be reliably detected using a reduced sampling rate. Specifically, stretching the heterodyne beat signal involves extending the duration of the signal so that the signal can be detected with fewer samples per unit of time than an unstretched signal. The reduced sampling rate generates a smaller volume of data per scan that must be processed to generate scan results. Processing a smaller volume of data enables quicker generation of scan results. An advantage to stretching the heterodyne beat signal and sampling at a reduced rate is that a wide wavelength range can be quickly scanned to locate an unknown signal and then a more narrow scan, focused around the located signal, can be performed on an unstretched version of the heterodyne beat signal. The unstretched heterodyne beat signal can be sampled at a high enough rate to adequately resolve the fringe pattern of the heterodyne beat signal.

An embodiment of the invention is a system for optical spectrum analysis that includes a local oscillator source, an optical coupler, a heterodyne receiver, and a processor. The local oscillator source generates a swept local oscillator signal that sweeps across a range of frequencies. The optical coupler has a first input and a second input, the first input being optically connected to receive an input signal and the second input being optically connected to the local oscillator source to receive the swept local oscillator signal. The optical coupler has an output for outputting a combined optical signal that includes the input signal and the swept local oscillator signal. The heterodyne receiver has an input for receiving the combined optical signal from the optical coupler, a circuit for stretching a heterodyne beat signal that is generated by the heterodyne receiver in response to the combined optical signal, and an output for outputting heterodyne beat signal data that is generated in response to the stretched heterodyne beat signal. The processor utilizes the heterodyne beat signal data from the heterodyne receiver to generate an output signal that is indicative of an optical parameter of the input signal.

An embodiment of the stretcher circuit includes a diode in series with a capacitor and a resistor. Another embodiment of the stretcher circuit includes a diode in series with a capacitor and a switch.

The heterodyne receiver may include an analog processor for rectifying and applying a log function to the heterodyne beat signal and a data acquisition unit for sampling the stretched heterodyne beat signal to generate the heterodyne beat signal data. In an embodiment, the data acquisition unit samples the stretched heterodyne beat signal at a rate in the range of 20 kHz to 500 kHz.

Another embodiment of the system for optical spectrum analysis includes a high resolution data acquisition unit that samples the heterodyne beat signal at a rate in the range of 5 MHz to 100 MHz to generate high resolution heterodyne beat signal data. The high resolution heterodyne beat signal data can be used to generate a high resolution output signal that is indicative of an optical parameter of the input signal.

Another embodiment of the invention is a method for optical spectrum analysis that involves providing an input signal, providing a swept local oscillator signal that sweeps across a range of frequencies, and combining the input signal with the swept local oscillator signal to create a combined optical signal. The combined optical signal is then detected to generate a heterodyne beat signal. The heterodyne beat signal is stretched and heterodyne beat signal data is obtained from the stretched heterodyne beat signal. An output signal that is indicative of an optical parameter of the input signal is then generated from the heterodyne beat signal data.

In an embodiment of the method, stretching the heterodyne beat signal involves filling in gaps between peaks of the heterodyne beat signal and extending the duration of the heterodyne beat signal. The heterodyne beat signal may be rectified and logged before it is stretched.

In an embodiment, the stretched heterodyne beat signal is rapidly dropped after each sampling event.

In an embodiment, the heterodyne beat signal is sampled at a rate in the range of 20 kHz to 500 kHz.

In another embodiment of the method, high resolution heterodyne beat signal data is obtained from the heterodyne beat signal in addition to the data that is obtained from the stretched signal. A high resolution output signal that is indicative of an optical parameter of the input signal is generated from the high resolution heterodyne beat signal data. In an embodiment, the high resolution heterodyne beat signal data is obtained at a sampling rate in the range of 5 MHz–100 MHz.

Another embodiment of the invention involves obtaining a first set of heterodyne beat signal data using a first sampling rate and obtaining a second set of heterodyne beat signal data using a second sampling rate that is lower than the first sampling rate. Obtaining heterodyne beat signal data at two different sampling rates enables an OSA to perform relatively quick low resolution scans and slower high resolution scans.

A system for optical spectrum analysis that can obtain two sets of data includes a local oscillator source, an optical coupler, a heterodyne receiver, and a processor. In this system, the heterodyne receiver includes a low resolution data acquisition unit for outputting low resolution heterodyne beat signal data and a high resolution data acquisition unit for outputting high resolution heterodyne beat signal data. The processor utilizes the low resolution heterodyne beat signal data to generate a low resolution output signal and uses the high resolution heterodyne beat signal data to generate a high resolution output signal.

In an embodiment of the system, the low resolution data acquisition unit includes a circuit for stretching a heterodyne beat signal that is generated by the heterodyne receiver. In an embodiment, the stretcher circuit includes a diode in series with a capacitor and a resistor and in another embodiment, the stretcher circuit includes a diode in series with a capacitor and a switch.

In an embodiment, the low resolution data acquisition unit samples the stretched heterodyne beat signal at a rate in the range of 20 kHz to 500 kHz and the high resolution data acquisition unit samples the unstretched heterodyne beat signal at a rate in the range of 5 MHz to 100 MHz.

A method for optical spectrum analysis that includes high and low resolution capabilities involves providing an input signal, providing a swept local oscillator signal that sweeps across a range of frequencies, combining the input signal with the swept local oscillator signal to create a combined optical signal, detecting the combined optical signal to generate a heterodyne beat signal, obtaining low resolution heterodyne beat signal data from the heterodyne beat signal, and obtaining high resolution heterodyne beat signal data from the heterodyne beat signal. A low resolution output signal that is indicative of an optical parameter of the input signal is generated from the low resolution heterodyne beat signal data and a high resolution output signal that is indicative of an optical parameter of the input signal is generated from the high resolution heterodyne beat signal data.

In an embodiment of the method, obtaining the low resolution heterodyne beat signal data includes stretching the heterodyne beat signal. In a further embodiment, stretching the heterodyne beat signal includes filling in gaps between peaks of the heterodyne beat signal and extending the duration of the heterodyne beat signal.

In an embodiment of the method, the stretched heterodyne beat signal is sampled at a rate in the range of 20 kHz to 500 kHz to generate the low resolution heterodyne beat signal data and the unstretched heterodyne beat signal is sampled at a rate in the range of 5 MHz to 100 MHz to generate the high resolution heterodyne beat signal data.

In an embodiment of the method, the low resolution heterodyne beat signal data is obtained by sampling the stretched heterodyne beat signal at a slower rate than a sampling rate that is used to obtain the high resolution heterodyne beat signal data.

In an embodiment of the method, the low resolution output signal is generated before the high resolution output signal. In another embodiment, the high resolution heterodyne beat signal data is obtained simultaneously with the low resolution heterodyne beat signal data.

In another embodiment of the invention, high resolution heterodyne beat signal data is generated in response to the low resolution output signal. Specifically, in an embodiment, the sweep range used to obtain the high resolution heterodyne beat signal data is selected in response to a previously obtained low resolution output signal.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a depiction of heterodyne based OSA as is known in the prior art.

FIG. 2 depicts an example heterodyne beat signal that is generated in response to mixing of an input signal and a swept local oscillator signal and signal samples that are obtained at a high enough sampling rate to adequately resolve the fringe pattern of the signal.

FIG. 3 depicts the example heterodyne beat signal of FIG. 2 and signal samples that are obtained at a rate that can cause the signal to go undetected.

DETAILED DESCRIPTION OF THE INVENTION

Figure 4:
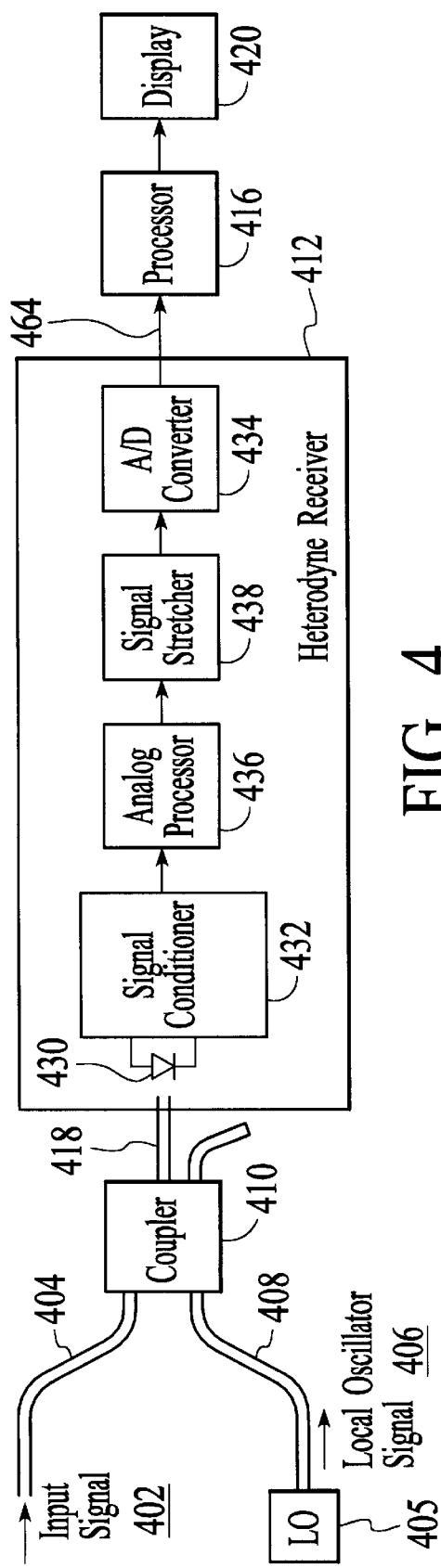
FIG. 4 depicts a heterodyne based OSA that includes a signal stretcher in accordance with an embodiment of the invention.

FIG. 4 depicts an embodiment of a heterodyne based optical spectrum analyzer that utilizes signal stretching. The optical spectrum analyzer includes a signal fiber 404, a local oscillator source 405, a local oscillator fiber 408, an optical coupler 410, a heterodyne receiver 412, a processor 416, and a display 420. It should be noted that throughout the description, similar reference numerals are utilized to identify similar elements.

The signal fiber 404 carries an input signal 402 that is to be detected by the system. In an embodiment, the signal fiber is a single mode optical fiber as is known in the field. Throughout the description, the optical signals that are carried in optical fibers may alternatively be carried in other waveguides or in free space.

The input signal 402 includes highly coherent optical signals that are generated from conventional devices as is known in the field of optical communications systems. For example, the input signal may be generated from a single laser or multiple lasers and may consist of a single wavelength or multiple wavelengths as is known in the field of wavelength division multiplexing. The input signal is frequently modulated to carry digital information. Alternatively, the input signal could be modulated to carry analog information. Throughout the description, optical signals may include signal in the visible spectrum, the infrared spectrum, or any other optical spectrum.

In an embodiment, the input signal 402 has unknown optical characteristics that are measured by the optical spectrum analyzer. The input signal may alternatively be an optical signal that is input with known optical characteristics, in which case the optical spectrum analyzer can be utilized for optical network analysis. When the optical spectrum analyzer is utilized for optical network or component analysis, the characteristics of a network or a single component can be determined by inputting a known input signal into the network or the single component and then measuring the response to the known signal.

The local oscillator source 405 generates a local oscillator signal 406. In an embodiment, the local oscillator source is a highly coherent tunable laser that is tunable over a wavelength range of one nanometer or greater. During optical spectrum analysis, the local oscillator source generates a highly coherent local oscillator signal that is swept across a range of frequencies, or wavelengths, in order to detect the input signal over the range of frequencies or wavelengths. In an embodiment, the sweep rate of the local oscillator signal at 1,550 nanometers is approximately 40 nm/s or 6.15 MHz/µs and the sweep range is approximately 100 nm, however the sweep rate and sweep range can be higher or lower.

The local oscillator fiber 408 is an optical fiber, such as a single mode optical fiber, that carries the local oscillator signal 406 to the optical coupler 410.

The optical coupler 410 combines the input signal 402 and the swept local oscillator signal 406 onto a common waveguide. As shown in FIG. 4, the optical coupler combines the input signal and the swept local oscillator signal and distributes the combined optical signal into an output fiber 418. Although only one output fiber is shown in FIG. 4, more than one output fiber can be utilized to transmit a portion of the combined optical signal to the heterodyne receiver 412 for balanced detection.

The optical coupler 410 may be an optically directional 3 dB fiber coupler, although other optical couplers may be utilized. In an embodiment, the optical coupler is substantially independent of the wavelength and polarization of the input signal 402 and the swept local oscillator signal 406. In an embodiment, the optical coupler is a single mode coupler.

The output fiber 418 is a single mode optical fiber that carries the combined optical signal from the optical coupler 410 to the heterodyne receiver 412. Multiple output fibers may be utilized to support, for example, a balanced receiver.

The heterodyne receiver 412 is connected to receive the combined optical signal from the optical coupler 410. In an embodiment, the heterodyne receiver utilizes square law detection, which results in mixing of the input signal 402 and the swept local oscillator signal 406. Mixing of the two optical signals produces a heterodyne beat signal at a frequency that is equal to the frequency difference between the input signal and the swept local oscillator signal. For highly coherent input and local oscillator signals the resulting heterodyne beat signal has a quadratic phase behavior resulting from the linearly changing frequency of the heterodyne beat signal. Heterodyne beat signal data generated by the heterodyne receiver is provided to the signal processor 416 via an electrical connection 464.

In the embodiment of FIG. 4, the heterodyne receiver 412 includes a detector 430, a signal conditioner 432, an analog processor 436, a signal stretcher 438, and an analog-to-digital converter 434. The detector is a solid state photodetector as is known in the field. The detector outputs an electrical signal to the signal conditioner. As an alternative to a photodetector based optical receiver, the heterodyne receiver may utilize other detection devices, such as a non-linear mixing element.

The signal conditioner 432 includes circuits that condition the electrical signal for subsequent processing. In an embodiment, the signal conditioner may include analog circuits for amplifying and filtering the signal. The conditioned signal is then output to the analog processor 436.

The analog processor 436 prepares the conditioned signal for the stretching that is performed by the signal stretcher 438. In an embodiment and as described in more detail below, the analog processor includes circuits for rectifying the signal and for applying a log function to the signal. The processed analog signal is then output to the signal stretcher. In an alternative embodiment, the functions of the analog processor may be performed after the signal stretcher.

The signal stretcher 438 takes an analog signal of a given pulse length (i.e., duration in time) and stretches the signal to fill in the gaps between the peaks of the signal and to extend the duration of the signal. Filling in the gaps between the peaks of the signal ensures that the signal is detected regardless of when a sample is taken. Extending the duration of the signal allows for longer sampling periods to be used and ensures that the signal will not pass undetected between sampling events. Signals must be stretched to at least as long as the sampling period. If an analog-to-digital converter is used to acquire digital data points, then the signal is stretched to at least as long as the sampling period, thereby ensuring that at least one sampling event falls within the stretched signal. The degree to which an analog signal is stretched can be adjusted as necessary for a particular application.

Figure 5:
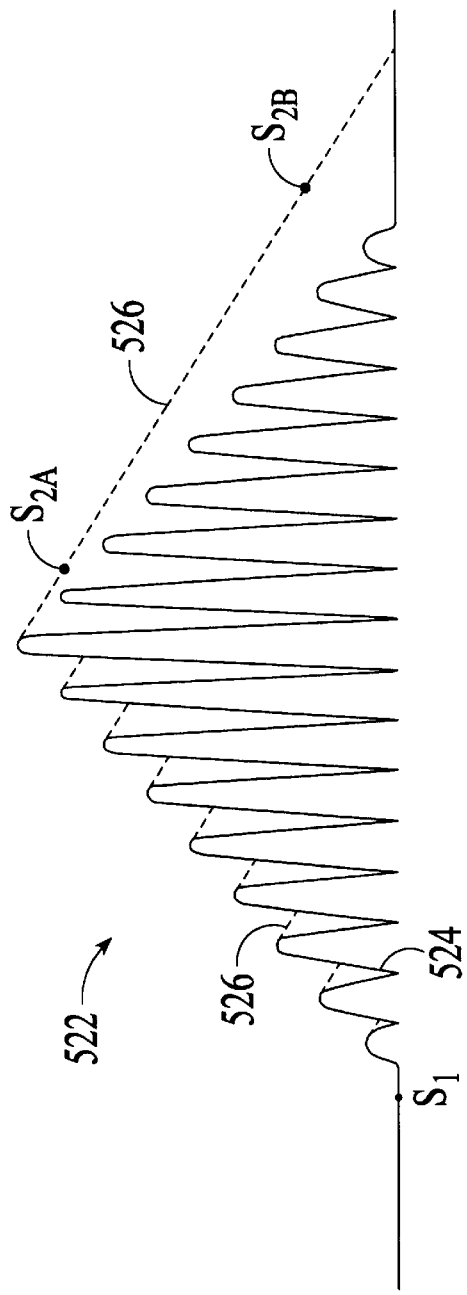
FIG. 5 depicts a stretched heterodyne beat signal that decays relatively quickly in accordance with an embodiment of the invention.

FIG. 5 depicts a heterodyne beat signal 522 to which a relatively short stretch has been applied. The solid lines 524 depict a rectified and amplified heterodyne beat signal before it has been stretched and the dashed lines 526 depict the same heterodyne beat signal after is has been stretched. As depicted in FIG. 5, on the rising edge of the stretched heterodyne beat signal the gaps between the peaks of the signal have been filled in by the signal stretching. In the example of FIG. 5, the stretched signal decays noticeably between each peak of the fringe pattern. On the falling edge of the stretched heterodyne beat signal, the peaks of the signal are filled in by the signal stretching as the signal decays from its peak. The slope of the signal decay line is a function of the stretcher circuit and can be adjusted as described below. The relatively fast decay of the stretched signal depicted in FIG. 5 is a characteristic of a relatively short stretch.

Stretching a heterodyne beat signal ensures that the heterodyne beat signal is detected during data acquisition because the gaps between the peaks of the signal are essentially eliminated and because the signal is stretched to be at least as long as the sampling period. The ability of signal stretching to ensure signal detection is illustrated by the example samples $S_1$, $S_{2A}$, and $S_{2B}$ that are depicted in FIG. 5. The first sample, sample $S_1$, is taken before the appearance of the fringe pattern, so no signal is detected. The next sample, sample $S_{2A}$, is taken at some point in time after the first sample. Even if the sample is taken at a point in time that corresponds to a gap between peaks of the unstretched heterodyne beat signal, the signal is detected because the gaps between the peaks have been essentially eliminated by stretching the signal. In another scenario, if the next sample after sample $S_1$ is taken after the appearance of the unstretched heterodyne beat signal (i.e., sample $S_{2B}$), the signal is still detected as long as the signal has been stretched to at least as long as the sampling period. As depicted in FIG. 5, even though sample $S_{2B}$ is taken at a time that would have been after the appearance of the unstretched heterodyne beat signal, the stretched heterodyne beat signal is still detectable during the second sampling event. By stretching the heterodyne beat signal before data acquisition, gaps between signal peaks are essentially eliminated and the duration of the signal is extended such that the signal is still detected with a reduced sampling rate.

Figure 6:
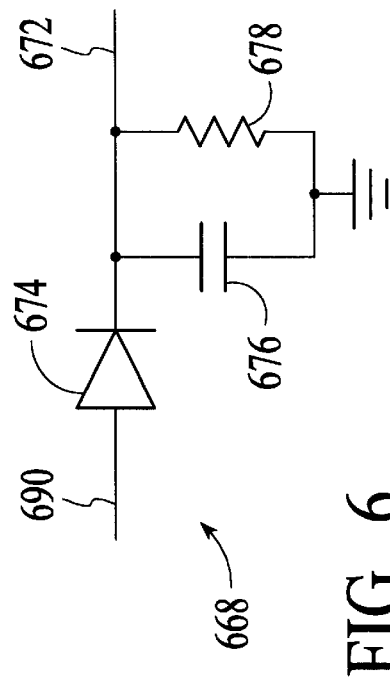
FIG. 6 depicts a stretcher circuit that can be used to perform the signal stretching of FIG. 5 in accordance with an embodiment of the invention.

An example embodiment of a stretcher circuit 668 that can be used to perform the signal stretching of FIG. 5 is depicted in FIG. 6. The stretcher circuit receives an unstretched heterodyne beat signal at its input 670 and provides a stretched heterodyne beat signal at its output 672. The stretcher circuit includes a diode 674 in series with a capacitor 676 and a resistor 678. The diode restricts the flow of current back to the input and the capacitor stores charge from a received signal. The resistor controls the rate of discharge of the capacitor. A relatively high resistance produces a slow discharge from the capacitor, which translates to a longer stretch of the heterodyne beat signal (i.e., a flatter slope of the decay line). Likewise, a relatively low resistance produces a faster discharge of the capacitor, which translates to a shorter stretch of the heterodyne beat signal (i.e., steeper slope of the decay line).

Figure 7:
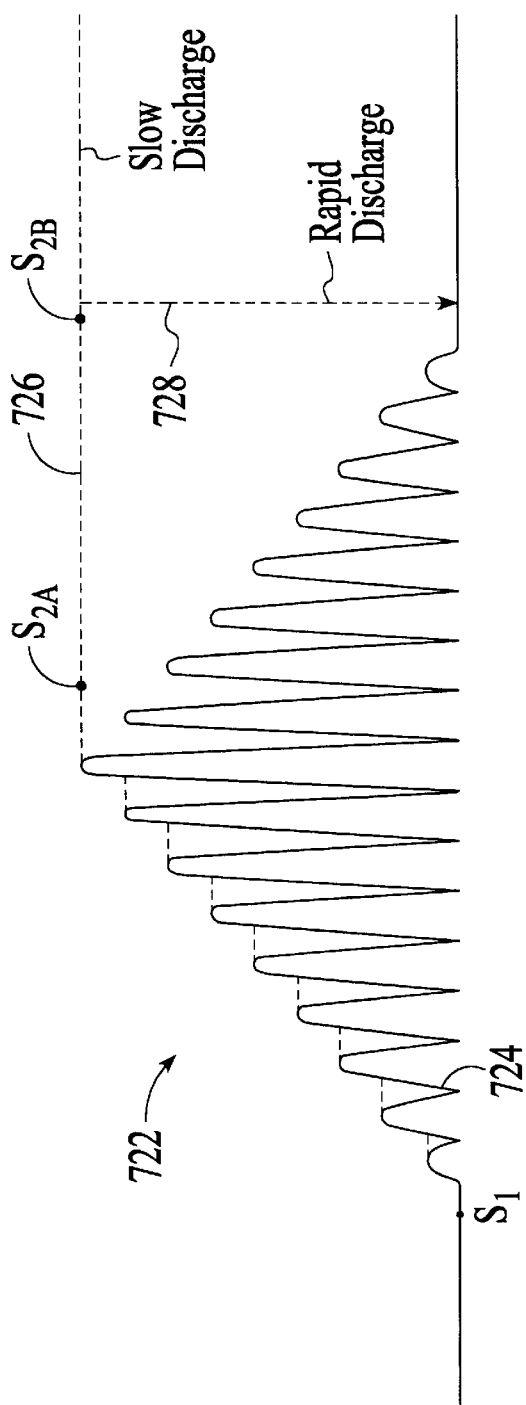
FIG. 7 depicts a stretched heterodyne beat signal that decays very little over time and that can be quickly brought to zero in accordance with an embodiment of the invention.

FIG. 7 depicts a heterodyne beat signal 722 to which a relatively long stretch has been applied. The solid lines 724 depict a rectified and amplified heterodyne beat signal before it has been stretched and the dashed lines 726 depict the same heterodyne beat signal after is has been stretched. As depicted in FIG. 7, on the rising edge of the stretched heterodyne beat signal the gaps between the peaks of the signal have been filled in by the signal stretching. In the example of FIG. 7, the stretched signal extends nearly horizontally from each peak of the fringe pattern because the signal decays at such a slow rate. On the falling edge of the stretched heterodyne beat signal, the peaks of the signal are filled in by the signal stretching as the signal extends nearly horizontally from its peak. Although the signal is ideally stretched horizontally, there is typically some small decay in the signal. The relatively slow decay of the stretched signal depicted in FIG. 7 is a characteristic of a relatively long stretch. In an embodiment, the stretched signal can be rapidly reduced as indicated by dashed line 728.

The ability of signal stretching to ensure signal detection is illustrated by the example samples $S_1$, $S_{2A}$, and $S_{2B}$ that are depicted in FIG. 7. The first sample, sample $S_1$, is taken before the appearance of the fringe pattern, so no signal is detected. The next sample, sample $S_{2A}$, is taken at some point in time after the first sample. Even if the sample is taken at a point in time that corresponds to a gap between peaks of the unstretched heterodyne beat signal, the signal is detected because the gaps have been essentially eliminated by stretching the signal. In the other scenario, if the next sample after sample $S_1$ is taken after the appearance of the unstretched heterodyne beat signal (i.e., sample $S_{2B}$), the signal is still detected as long as the signal has been stretched to at least as long as the sampling period. As depicted in FIG. 7, even though sample $S_{2B}$ is taken at a time that would have been after the appearance of the unstretched heterodyne beat signal, the stretched heterodyne beat signal is still detectable during the second sampling event. If the time of each sampling event is known, the signal can be rapidly reduced immediately after the sample is taken as indicated by dashed line 728. By stretching the heterodyne beat signal before data acquisition, gaps between signal peaks are essentially eliminated and the signal duration is extended such that the signal is still detected with a reduced sampling rate.

Figure 8:
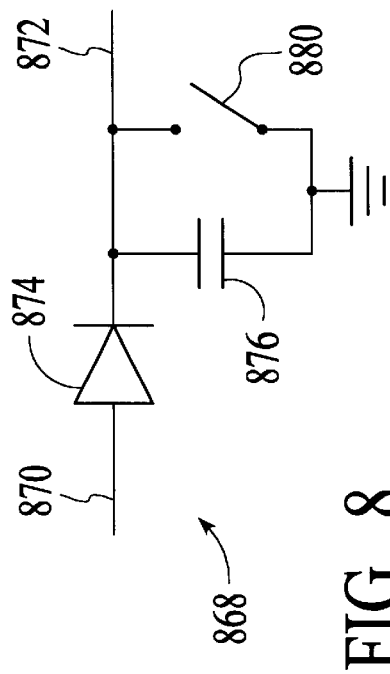
FIG. 8 depicts a stretcher circuit that can be used to perform the signal stretching of FIG. 7 in accordance with an embodiment of the invention.

An example embodiment of a stretcher circuit 868 that can be used to perform the signal stretching of FIG. 7 is depicted in FIG. 8. The stretcher circuit receives an unstretched heterodyne beat signal at its input 870 and provides a stretched heterodyne beat signal at its output 872. The stretcher circuit includes a diode 874 in series with a capacitor 876 and a switch 880. The diode restricts the flow of current back to the input and the capacitor stores charge from a received signal. The switch controls the discharge from the capacitor. When the switch is open (i.e., no current flows), the charge in the capacitor is maintained relatively constant. Maintaining the charge constant translates to a relatively long stretch of the heterodyne beat signal as indicated by the nearly horizontal decay line 726 in FIG. 7. When the switch is closed (i.e., a short circuit), the capacitor is rapidly discharged. Rapid discharge of the capacitor translates to a rapid reduction of the heterodyne beat signal to a zero, or near zero, reading as indicated by the nearly vertical decay line 728 in FIG. 7.

Referring back to FIG. 4, the analog-to-digital converter 434 converts the stretched analog heterodyne beat signal to digital heterodyne beat signal data by sampling the stretched heterodyne beat signal at periodic intervals. As described with reference to FIGS. 5 and 7, periodic sampling of the stretched heterodyne beat signal can be used to acquire digital data points. If the sampling period is such that only a few samples are taken during a signal pulse, then the resolution of the detected signal is reduced although the presence of the signal is still detected. The digital heterodyne beat signal data that is generated by the analog-to-digital converter is output to the processor 416.

The processor 416 includes a multifunction processor that receives the heterodyne beat signal data from the heterodyne receiver 412 and generates an output signal that is indicative of an optical parameter, such as optical frequency, wavelength, or amplitude, of the input signal 402. The signal processor may include analog signal processing circuitry, digital signal processing circuitry, or software or any combination thereof, as is known in the field of signal processing. In the embodiment of FIG. 4, the processor receives digital heterodyne beat signal data from the heterodyne receiver and the processor performs digital processing. In an alternative embodiment, the processor receives an analog heterodyne beat signal from the heterodyne receiver which is converted into a digital data by the processor. The digital data is subsequently processed to generate an output signal.

The display 420 can display the output signal from the processor 416. The display may provide numerical data, such as wavelength and frequency readings, or graphical data such as waveforms and fringe patterns.

Operation of the heterodyne-based OSA with signal stretching is described with reference to FIGS. 4–7. In operation, an input signal 402 propagates through the input fiber 404 of the OSA towards the optical coupler 410. Simultaneously, the local oscillator source 405 generates a swept local oscillator signal 406 that is transmitted through the local oscillator fiber 408 to the optical coupler. The input signal 402 and the swept local oscillator signal 406 are combined by the optical coupler into a combined optical signal. The combined optical signal is output onto output fiber 418 and transmitted to the heterodyne receiver 412. The combined optical signal is detected and mixed by the heterodyne receiver and a heterodyne beat signal is generated in response to the combined optical signal. The heterodyne beat signal is rectified and logged by the analog processor 436 and then the signal is stretched by the signal stretcher 438. The stretched signal 526 and 726 is then sampled by the analog-to-digital converter 434 and digital heterodyne beat signal data is output to the processor 416. The processor utilizes the digital heterodyne beat signal data to generate an output signal that is indicative of an optical parameter of the input signal, such as wavelength, frequency, or amplitude. The output signal can then be viewed through the display 420.

Figure 9:
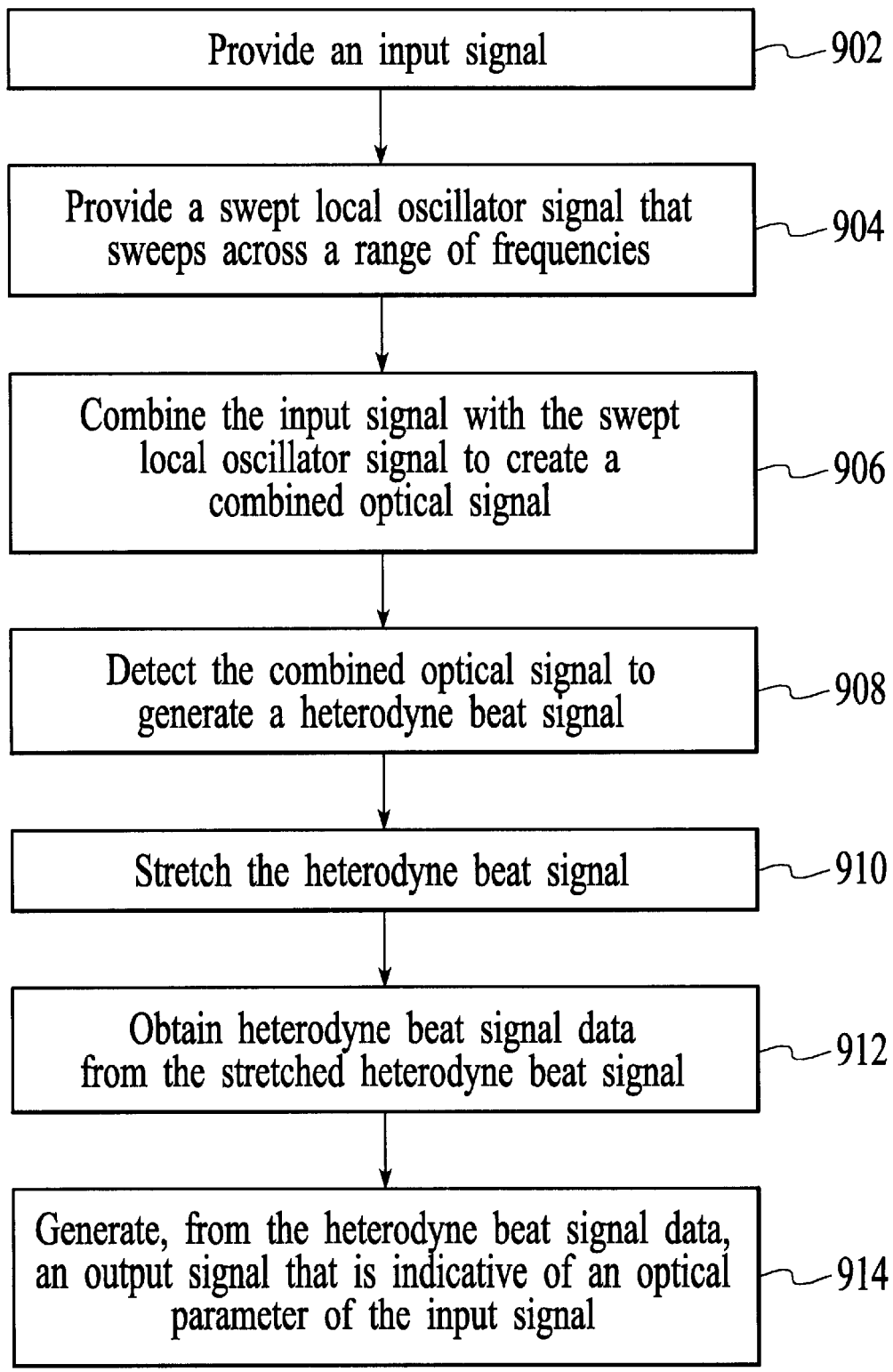
FIG. 9 is a process flow diagram of a method for optical spectrum analysis that utilizes signal stretching to identify the heterodyne beat signal in accordance with an embodiment of the invention.

A process flow diagram of a method for optical spectrum analysis that utilizes optical heterodyne detection is depicted in FIG. 9. At step 902, an input signal is provided. At step 904, a swept local oscillator signal is provided. At step 906, the input signal is combined with the swept local oscillator signal to create a combined optical signal. At step 908, the combined optical signal is detected to generate a heterodyne beat signal. At step 910, the heterodyne beat signal is stretched. At step 912, heterodyne beat signal data is obtained from the stretched heterodyne beat signal. At step 914, an output signal, which is indicative of an optical parameter of the input signal, is generated from the heterodyne beat signal data.

A high sampling rate (for example, 10 MHz) during analog-to-digital conversion will produce a large volume of data and high resolution at a cost of slower processing time. Conversely, a low sampling rate (for example, 200 kHz) during analog-to-digital conversion will produce fewer data points and faster processing time at a cost of lower resolution. When high resolution is desired, stretching of the heterodyne beat signal should be avoided because it distorts the actual form of the heterodyne beat signal's fringe pattern. In some situations it may be desirable to have the ability to perform a low resolution scan over a wide wavelength range that can quickly locate an optical signal and then perform a high resolution scan over a narrower wavelength range. Performing the high resolution scan over a narrower wavelength range generates a lower volume of heterodyne beat signal data than would be generated from a high resolution scan of the entire wavelength range of the OSA. The lower volume of data can be processed faster and leads to faster scan results.

Figure 10:
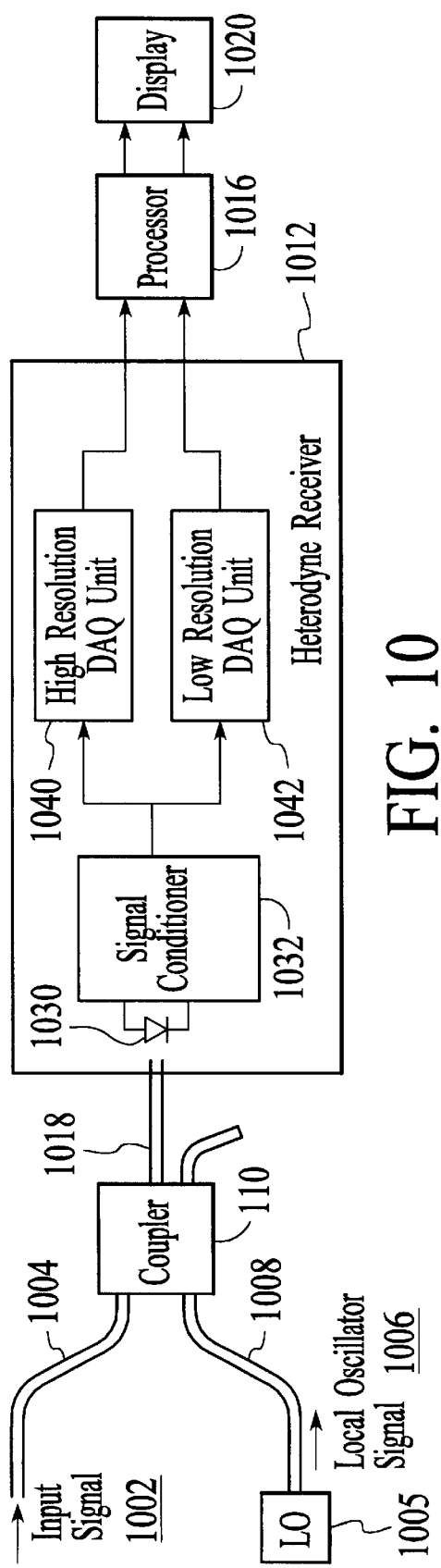
FIG. 10 depicts an embodiment of a dual mode heterodyne based OSA having a heterodyne receiver that includes a high resolution data acquisition unit in parallel with a low resolution data acquisition unit in accordance with an embodiment of the invention.

The ability to scan in two modes is provided in a heterodyne based optical spectrum analyzer that includes a high resolution data acquisition unit and a low resolution data acquisition unit. The high resolution data acquisition unit acquires high resolution heterodyne beat signal data from an unstretched version of the heterodyne beat signal and the low resolution data acquisition unit acquires low resolution heterodyne beat signal data from a stretched version of the heterodyne beat signal. FIG. 10 depicts an embodiment of a dual mode heterodyne based optical spectrum analyzer having a heterodyne receiver that includes a high resolution data acquisition unit 1040 in parallel with a low resolution data acquisition unit 1042. In the embodiment of FIG. 10, the high resolution data acquisition unit outputs high resolution heterodyne beat signal data to the processor by sampling an unstretched version of the heterodyne beat signal at a relatively high sampling rate (for example, in the range of 1 MHz to 10 GHz, with a preferred range of 5 MHz to 100 MHz) and the low resolution data acquisition unit outputs low resolution heterodyne beat signal data to the processor by sampling a stretched version of the heterodyne beat signal at a relatively low rate (for example, in the range of 1 Hz to 1 MHz, with a preferred range of 20 kHz to 500 kHz).

In an embodiment, the high and low resolution data acquisition units generate heterodyne beat signal data simultaneously and in another embodiment, the data acquisition units generate heterodyne beat signal data serially. In one embodiment, the low resolution data acquisition unit is used initially to locate the approximate wavelength range of an input signal and then the high resolution data acquisition unit is used to zoom in on the wavelength range and produce high resolution data. For example, after an initial broad local oscillator sweep, a new, more narrow, sweep range is selected to obtain the high resolution heterodyne beat signal data. FIG. 10 depicts individual connections between the data acquisition units and the processor to indicate that heterodyne beat signal data can be provided to the processor from both data acquisition units in parallel.

Figure 11:
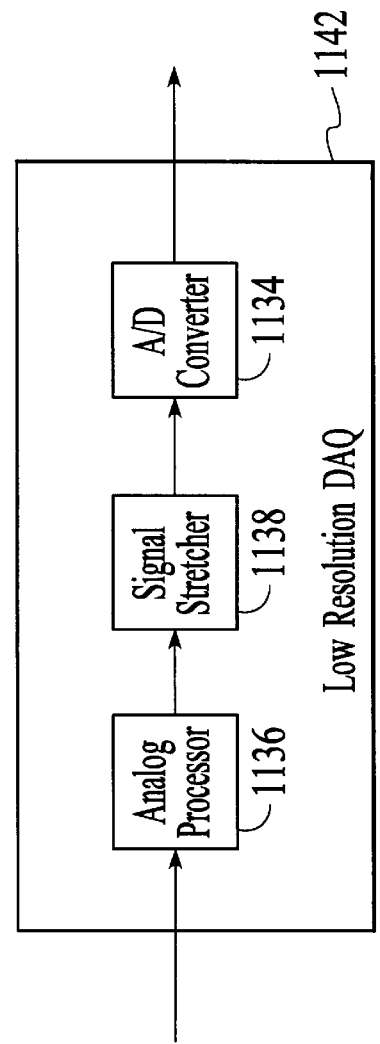
FIG. 11 depicts an expanded view of the low resolution data acquisition unit of FIG. 10 in accordance with an embodiment of the invention.

The low resolution data acquisition unit 1042 depicted in the heterodyne receiver of FIG. 10 incorporates similar functional elements as the heterodyne receiver 412 depicted in FIG. 4. FIG. 11 depicts an expanded view of an embodiment of the low resolution data acquisition unit 1042 of FIG. 10. The low resolution data acquisition unit 1142 includes an analog processor 1136, a signal stretcher 1138, and an analog-to-digital converter 1134. The analog processor, signal stretcher, and analog-to-digital converter perform the same functions as the corresponding elements described above with reference to FIG. 4 and therefore the descriptions provided above apply equally to the low resolution data acquisition unit of FIG. 11.

Figure 12:
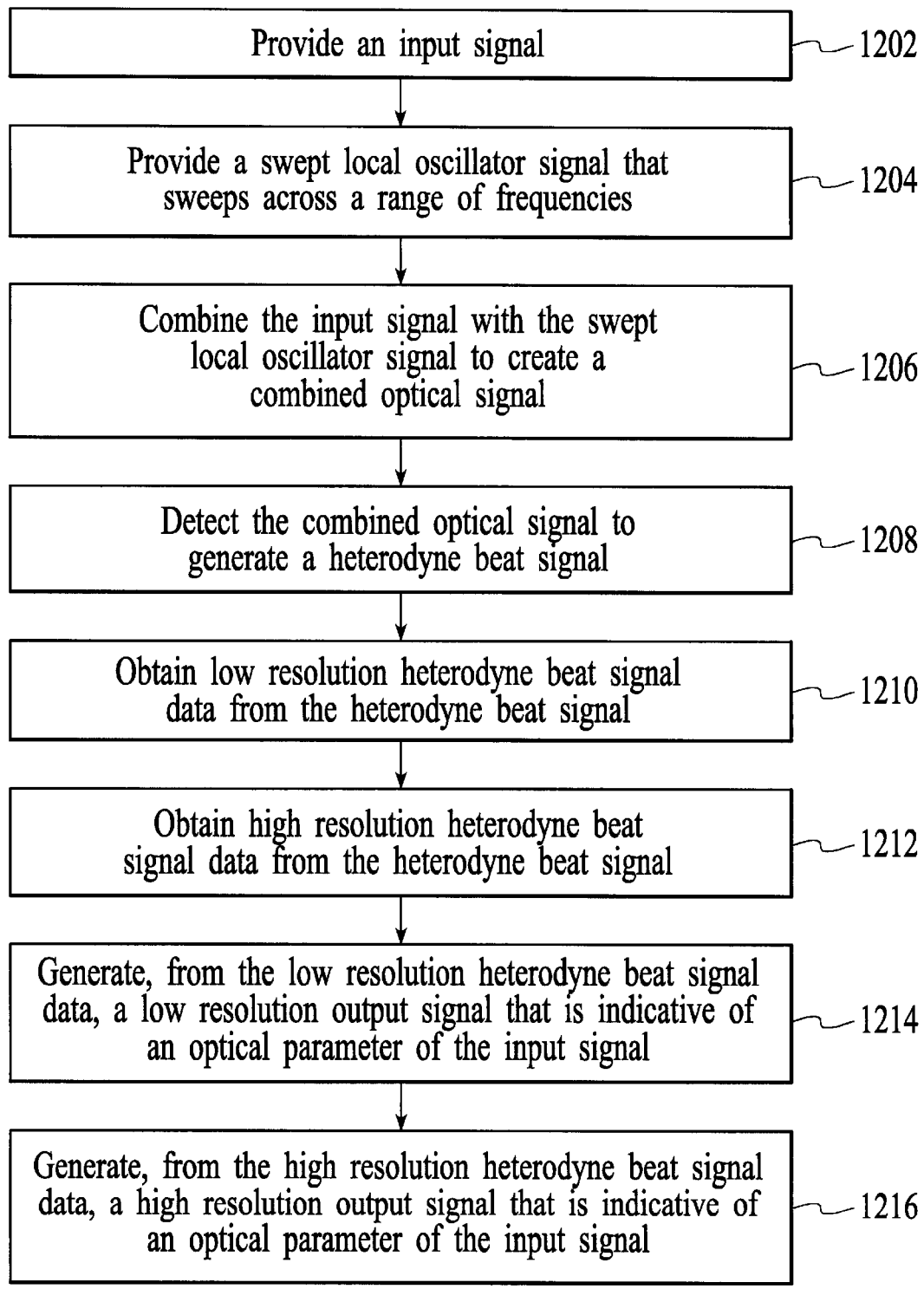
FIG. 12 is a process flow diagram of a method for optical spectrum analysis that acquires high resolution heterodyne beat signal data and low resolution heterodyne beat signal data in accordance with an embodiment of the invention.

A process flow diagram of a method for optical spectrum analysis that utilizes two modes of optical heterodyne detection is depicted in FIG. 12. At step 1202, an input signal is provided. At step 1204, a swept local oscillator signal is provided. At step 1206, the input signal is combined with the swept local oscillator signal to create a combined optical signal. At step 1208, the combined optical signal is detected to generate a heterodyne beat signal. At step 1210, low resolution heterodyne beat signal data is obtained from the heterodyne beat signal. At step 1212, high resolution heterodyne beat signal data is obtained from the heterodyne beat signal. At step 1214, a low resolution output signal, which is indicative of an optical parameter of the input signal, is generated from the low resolution heterodyne beat signal data. At step 1216, a high resolution output signal, which is indicative of an optical parameter of the input signal, is generated from the high resolution heterodyne beat signal data.

Figure 13:
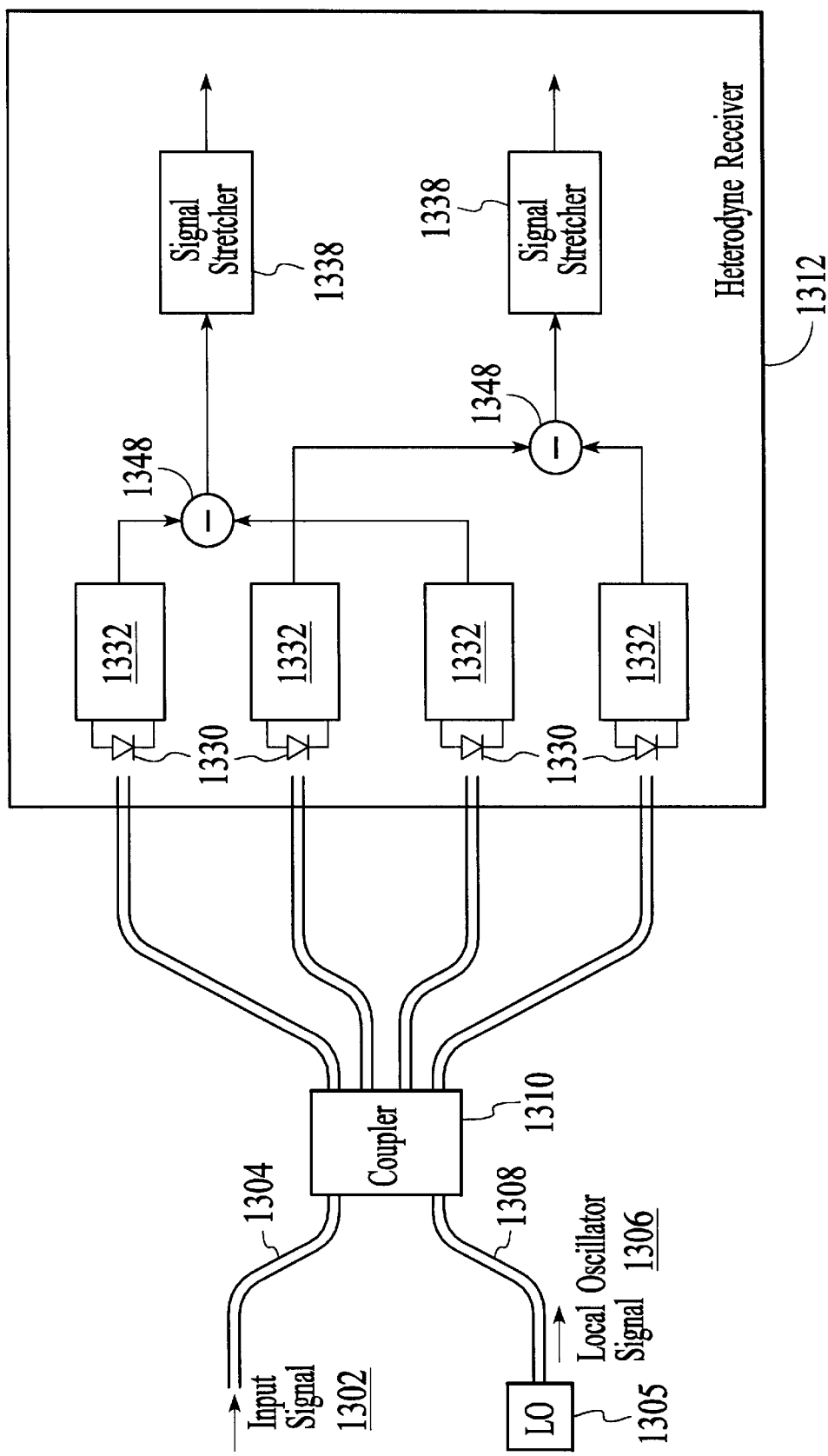
FIG. 13 depicts a heterodyne receiver that subtracts signals through subtraction circuits before signal stretching.

Although not depicted in FIG. 4 or 10, the input signal and swept local oscillator signal can be combined into more than one output fiber. For example, to achieve polarization diversity or balanced detection, the input signal and swept local oscillator signal may be combined into two or four output fibers. When the input signal and swept local oscillator signal are combined into more than one output fiber, the corresponding heterodyne receiver includes a corresponding number of detectors and signal processing circuits. For example, a receiver with four detectors may include four sets of the functional units depicted in the single-detector heterodyne receivers of FIGS. 4 and 10. That is, each combined optical signal is processed by a unique set of functional units. In an alternative embodiment, the signals are combined (for example, by subtraction or addition) before the signals are stretched. A heterodyne receiver 1312 that subtracts signals through subtraction circuits 1348 before stretching is depicted in FIG. 13. The heterodyne receiver depicted in FIG. 13 does not include the analog processor and analog-to-digital converter of the receiver of FIG. 4 to make the figure easier to view, however, those functional elements may certainly be included in the receiver.

Although the optical components of the optical heterodyne detection system are described as being connected by optical fibers, the individual devices may be integrated onto a monolithic device, such as a planar waveguide circuit. Alternatively, the optical elements may be connected by free space.

Although specific embodiments of the invention have been described and illustrated, the invention is not limited to the specific forms and arrangements of parts so described and illustrated. The invention is limited only by the claims.

What is claimed is:

1. A system for optical spectrum analysis comprising:
   a local oscillator source for generating a swept local oscillator signal that sweeps across a range of frequencies;
   an optical coupler having a first input and a second input, said first input being optically connected to receive an input signal, said second input being optically connected to said local oscillator source to receive said swept local oscillator signal, said optical coupler having an output for outputting a combined optical signal that includes said input signal and said swept local oscillator signal;
   a heterodyne receiver having an input for receiving said combined optical signal from said optical coupler, means for stretching a heterodyne beat signal that is generated by said heterodyne receiver in response to said combined optical signal, and an output for outputting heterodyne beat signal data that is generated in response to said stretched heterodyne beat signal; and a processor for utilizing said heterodyne beat signal data from said heterodyne receiver to generate an output signal that is indicative of an optical parameter of said input signal.

2. The system of claim 1 wherein said means for stretching includes a diode in series with a capacitor and a resistor.

3. The system of claim 1 wherein said means for stretching includes a diode in series with a capacitor and a switch.

4. The system of claim 1 wherein said heterodyne receiver includes an analog processor for rectifying said heterodyne beat signal.

5. The system of claim 1 wherein said heterodyne receiver includes an analog processor for applying a log function to said heterodyne beat signal.

6. The system of claim 1 wherein said heterodyne receiver includes a data acquisition unit for sampling said stretched heterodyne beat signal to generate said heterodyne beat signal data.

7. The system of claim 6 wherein said data acquisition unit samples said stretched heterodyne beat signal at a rate in the range of 20 kHz to 500 kHz.

8. The system of claim 7 wherein said heterodyne receiver includes a high resolution data acquisition unit that samples said heterodyne beat signal at a rate in the range of 5 MHz to 100 MHz to generate high resolution heterodyne beat signal data.

9. The system of claim 8 wherein said signal processor utilizes said high resolution heterodyne beat signal data from said heterodyne receiver to generate a high resolution output signal that is indicative of an optical parameter of said input signal.

10. A method for optical spectrum analysis that utilizes optical heterodyne detection, the method comprising:

providing an input signal;

providing a swept local oscillator signal that sweeps across a range of frequencies;

combining said input signal with said swept local oscillator signal to create a combined optical signal;

detecting said combined optical signal to generate a heterodyne beat signal;

stretching said heterodyne beat signal;

obtaining heterodyne beat signal data from said stretched heterodyne beat signal; and generating, from said heterodyne beat signal data, an output signal that is indicative of an optical parameter of said input signal.

11. The method of claim 10 wherein stretching said heterodyne beat signal includes filling in gaps between peaks of said heterodyne beat signal and extending the duration of said heterodyne beat signal.

12. The method of claim 11 wherein stretching said heterodyne beat signal includes rectifying said heterodyne beat signal.

13. The method of claim 12 wherein stretching said heterodyne beat signal includes applying a log function to said heterodyne beat signal.

14. The method of claim 10 further including a step of rapidly dropping said stretched heterodyne beat signal after said heterodyne beat signal data has been obtained.

15. The method of claim 10 wherein obtaining said heterodyne beat signal data from said stretched heterodyne beat signal includes sampling said stretched heterodyne beat signal at a rate in the range of 20 kHz to 500 kHz.

16. The method of claim 10 further including:

obtaining high resolution heterodyne beat signal data from said heterodyne beat signal;

generating, from said high resolution heterodyne beat signal data, a high resolution output signal that is indicative of an optical parameter of said input signal.

17. The method of claim 16 wherein obtaining said high resolution heterodyne beat signal data includes sampling said heterodyne beat signal at a rate in the range of 5 MHz–100 MHz.

18. A system for optical spectrum analysis comprising:

a local oscillator source for generating a swept local oscillator signal that sweeps across a range of frequencies;

an optical coupler having a first input and a second input, said first input being optically connected to receive an input signal, said second input being optically connected to said local oscillator source to receive said swept local oscillator signal, said optical coupler having an output for outputting a combined optical signal that includes said input signal and said swept local oscillator signal;

a heterodyne receiver having an input for receiving said combined optical signal from said optical coupler, a low resolution data acquisition unit for outputting low resolution heterodyne beat signal data that is representative of said combined optical signal, and a high resolution data acquisition unit for outputting high resolution heterodyne beat signal data that is representative of said combined optical signal; and a processor for utilizing said low resolution heterodyne beat signal data from said heterodyne receiver to generate a low resolution output signal that is indicative of an optical parameter of said input signal and for utilizing said high resolution heterodyne beat signal data from said heterodyne receiver to generate a high resolution output signal that is indicative of an optical parameter of said input signal.

19. The system of claim 18 wherein said low resolution data acquisition unit includes means for stretching a heterodyne beat signal that is generated by said heterodyne receiver in response to said combined optical signal.

20. The system of claim 19 wherein said means for stretching includes a diode in series with a capacitor and a resistor.

21. The system of claim 19 wherein said means for stretching includes a diode in series with a capacitor and a switch.

22. The system of claim 19 wherein said low resolution data acquisition unit includes an analog processor for rectifying said heterodyne beat signal.

23. The system of claim 19 wherein said low resolution data acquisition unit includes an analog processor for applying a log function to said heterodyne beat signal.

24. The system of claim 19 wherein said low resolution data acquisition unit samples said stretched heterodyne beat signal at a rate in the range of 20 kHz to 500 kHz.

25. The system of claim 24 wherein said high resolution data acquisition unit samples said heterodyne beat signal at a rate in the range of 5 MHz to 100 MHz.

26. A method for optical spectrum analysis that utilizes optical heterodyne detection, the method comprising:

providing an input signal;

providing a swept local oscillator signal that sweeps across a range of frequencies;

combining said input signal with said swept local oscillator signal to create a combined optical signal;

detecting said combined optical signal to generate a heterodyne beat signal;

obtaining low resolution heterodyne beat signal data from said heterodyne beat signal;

obtaining high resolution heterodyne beat signal data from said heterodyne beat signal;

generating, from said low resolution heterodyne beat signal data, a low resolution output signal that is indicative of an optical parameter of said input signal; and generating, from said high resolution heterodyne beat signal data, a high resolution output signal that is indicative of an optical parameter of said input signal.

27. The method of claim 26 wherein obtaining said low resolution heterodyne beat signal data includes stretching said heterodyne beat signal.

28. The method of claim 27 wherein stretching said heterodyne beat signal includes filling in gaps between peaks of said heterodyne beat signal and extending the duration of said heterodyne beat signal.

29. The method of claim 27 wherein obtaining said low resolution heterodyne beat signal data includes sampling said stretched heterodyne beat signal at a rate in the range of 20 kHz to 500 kHz.

30. The method of claim 29 wherein obtaining said high resolution heterodyne beat signal data includes sampling said heterodyne beat signal at a rate in the range of 5 MHz to 100 MHz.

31. The method of claim 27 wherein obtaining said low resolution heterodyne beat signal data includes sampling said stretched heterodyne beat signal at a slower rate than a sampling rate that is used to obtain said high resolution heterodyne beat signal data.

32. The method of claim 26 wherein said low resolution output signal is generated before said high resolution output signal.

33. The method of claim 26 wherein said high resolution heterodyne beat signal data is obtained simultaneously with said low resolution heterodyne beat signal data.

34. A method for optical spectrum analysis that utilizes optical heterodyne detection, the method comprising:

providing an input signal;

providing a swept local oscillator signal that sweeps across a range of frequencies;

combining said input signal with said swept local oscillator signal to create a combined optical signal;

detecting said combined optical signal to generate a heterodyne beat signal;

obtaining low resolution heterodyne beat signal data from said heterodyne beat signal;

generating, from said low resolution heterodyne beat signal data, a low resolution output signal that is indicative of an optical parameter of said input signal;

obtaining high resolution heterodyne beat signal data from said heterodyne beat signal in response to said low resolution output signal that is indicative of an optical parameter of said input signal; and generating, from said high resolution heterodyne beat signal data, a high resolution output signal that is indicative of an optical parameter of said input signal.

35. The method of claim 34 wherein obtaining said low resolution heterodyne beat signal data includes stretching said heterodyne beat signal.

36. The method of claim 35 wherein obtaining said low resolution heterodyne beat signal data includes sampling said stretched heterodyne beat signal at a slower rate than a sampling rate that is used to obtain said high resolution heterodyne beat signal data.

37. The method of claim 34 wherein obtaining said high resolution heterodyne beat signal data includes a step of selecting a sweep range for said local oscillator signal in response to said low resolution output signal.

* * * * *